United States Patent
Yeh (10) Patent No.: US 7,326,094 B2
(45) Date of Patent: Feb. 5, 2008

(54) SLIDER

(76) Inventor: Tzong In Yeh, 4566 Crestwood St., Fremont, CA (US) 95438

( * ) Notice: Subject to any disclaimer, the term of this patent is extended or adjusted under 35 U.S.C. 154(b) by 0 days.

(21) Appl. No.: 11/533,254

(22) Filed: Sep. 19, 2006

(65) Prior Publication Data

US 2007/0015421 A1    Jan. 18, 2007

Related U.S. Application Data (63) Continuation-in-part of application No. 10/386,634, filed on Mar. 13, 2003, now Pat. No. 6,955,576.

(51) Int. Cl.
*B63B 1/00* (2006.01)
(52) U.S. Cl. .......................... 441/65; 441/74
(58) Field of Classification Search ............ 441/65, 441/70, 74
See application file for complete search history.

(56) References Cited

U.S. PATENT DOCUMENTS

| | | | |
|---|---|---|---|
| 4,850,913 A | 7/1989 | Szabad, Jr. | |
| 5,211,593 A | 5/1993 | Schneider et al. | |
| 6,955,576 B2 * | 10/2005 | Yeh | 441/65 |
| 6,988,920 B2 * | 1/2006 | Yeh | 441/65 |
| 7,083,486 B2 * | 8/2006 | Yeh | 441/65 |
| 7,128,628 B2 * | 10/2006 | Yeh | 441/65 |
| 7,172,481 B2 * | 2/2007 | Yeh | 441/65 |

* cited by examiner

*Primary Examiner*—Lars A. Olson
(74) *Attorney, Agent, or Firm*—Rosenberg, Klein & Lee (57) ABSTRACT

A slider comprises a polyethylene foam board, a first polyethylene foam skin, a first plastic film, a second polyethylene foam skin and a second plastic film. The polyethylene foam board comprises a top surface, a bottom surface and lateral surfaces. The first polyethylene foam skin is bonded with the top and lateral surfaces of the polyethylene foam board; and the first polyethylene foam skin comprises a density greater than that of the polyethylene foam board. Additionally, the first plastic film is bonded with the first polyethylene foam skin, and comprises two layers and a pattern defined between the two layers. The second polyethylene foam skin is bonded with the bottom surface of the polyethylene foam board, and the second polyethylene foam skin comprises a density greater than that of the polyethylene foam board. Furthermore, the second plastic film is bonded with the second polyethylene foam skin, and comprises a thickness greater than the first plastic film.

8 Claims, 9 Drawing Sheets

SLIDER

The present invention is a continuation-in-part application of application Ser. No. 10/386,634, filed Mar. 13, 2003, now U.S. Pat. No. 6,955,576.

TECHNICAL FIELD

This invention relates generally to a slider, in particular, to provide a slider having at least one protective layer protecting the foam material of the slider from corrosion of moisture, dirt and ultraviolet of sunlight and the pattern on the slider from wear and tear. The slider can be used as a bodyboard, a snowboard, a snow sled, a grass sliding board, sand sliding board or the like.

BACKGROUND OF THE INVENTION

A traditional slider used as a snowboard comprises a board and two handles installed at two sides. The slider comprises a pattern thereon. The traditional board is made of hardened plastic because hardened plastic is wear resistant. Although hardened plastic comprises a nature of wear resistance, users do not feel comfortable when physically contact with the board. The traditional slider is heavy, so it is not convenient for the users especially children to carry it. Besides, the pattern printed on the board or the pattern on a sticker stamped on the board is easily worn out since it directly contacts human body, air and sunlight.

Another traditional slider is made of expended polyethylene. The main structure of the slider is a board. There are many "air-cells" in the board and the air-cells decide the weight feature of the board. For some bodyboards, an outer layer is bonded on a top of the board and several outer strips or rails are bonded around the surroundings of the board. The outer layer and outer strips are made of expended polyethylene at a foam rate less than the foam rate of the board. Therefore, the air-cells in the outer layer are smaller than the air-cells in the board. The slider made of expended polyethylene is more comfortable compared to the hardened plastic. However, the outer layer and the outer strips could be broken or peeled off under the sunshine for a period of time or after frequent uses. It is known that the ultraviolet will result the damage of the expended polyethylene; therefore, the air-cells of the outer layer and the outer strips are fragile under friction. Once the air-cells are exposed, water will retain in dents formed by the exposed air-cells and consequently reduce the life and durability of the board. Furthermore, the pattern formed on the surfaces of the outer layer and the outer strips will accordingly fade quickly under the sunshine.

Therefore, a slider that can provide the users with comfortable touch and can resist wear and tear is needed.

SUMMARY OF INVENTION

It is therefore primary objective of the present invention to provide a slider that can resist corrosion of moisture, dirt and ultraviolet of sunlight at all sides.

Another object of the invention is to provide a slider that can prevent the pattern on the slider from wear and tear.

Further object of the invention is to provide a slider with improved surfaces.

More particularly, in one embodiment, the slider of the present invention mainly comprises a polyethylene foam board, a first polyethylene foam skin, a first plastic film, a second polyethylene foam skin and a second plastic film. The polyethylene foam board comprises a top surface, a bottom surface and lateral surfaces. The first polyethylene foam skin is bonded with the top and lateral surfaces of the polyethylene foam board; and the first polyethylene foam skin comprises a density greater than that of the polyethylene foam board. Additionally, the first plastic film is bonded with the first polyethylene foam skin, and comprises two layers and a pattern defined between the two layers. The second polyethylene foam skin is bonded with the bottom surface of the polyethylene foam board, and the second polyethylene foam skin comprises a density greater than that of the polyethylene foam board. Furthermore, the second plastic film is bonded with the second polyethylene foam skin, and comprises a thickness greater than the first plastic film.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
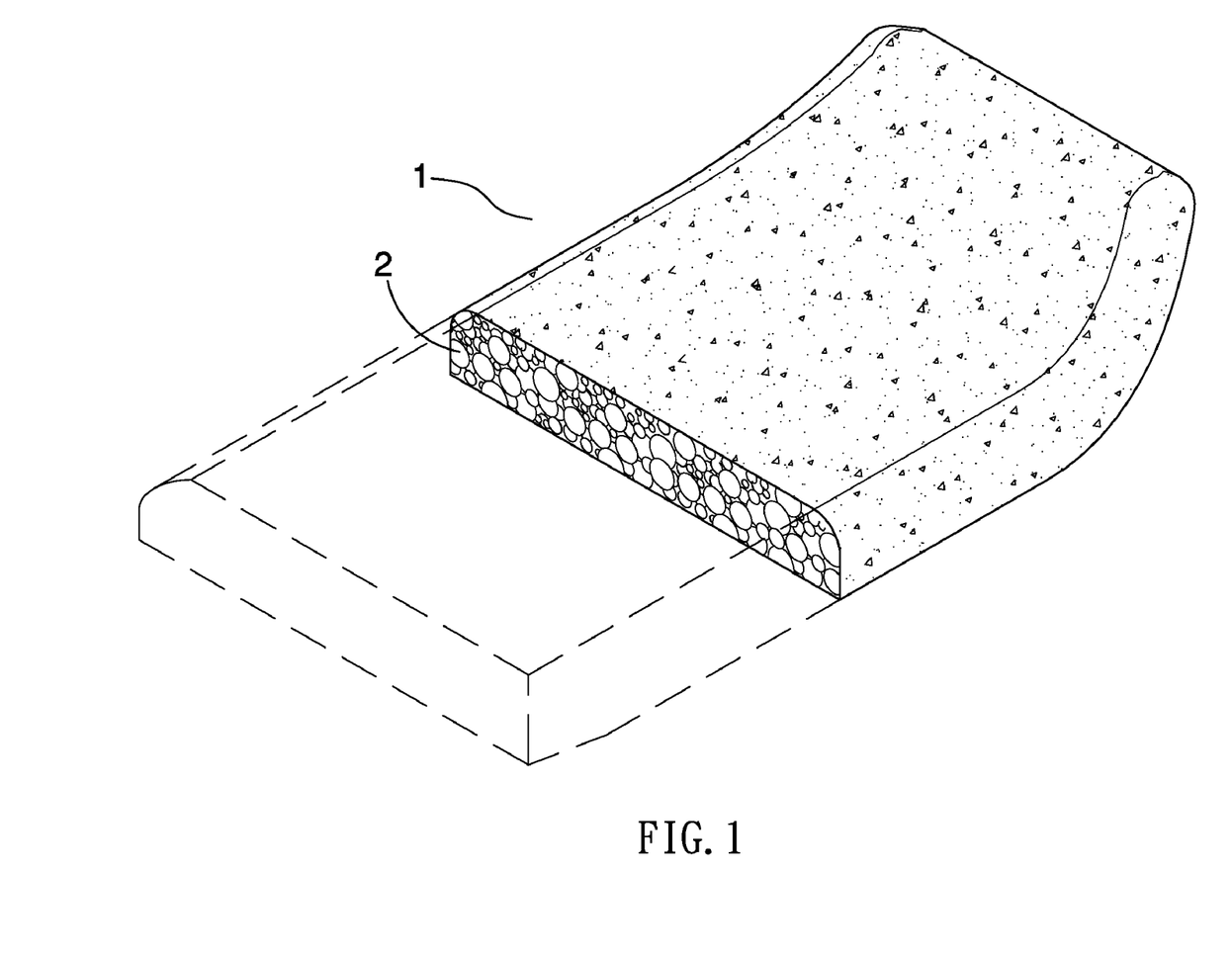
FIG. 1 is a perspective view of a polyethylene foam board.

FIG. 1 illustrates a polyethylene foam board 1 for a slider. The polyethylene foam board 1 is made of an expandable material. The polyethylene foam board 1 comprises a foam value from 1.2 PCF to 2.4 PCF. The PCF is referred to as per cube foot. The polyethylene foam board 1 comprises plural cells 2, and each of the cells 2 comprises a diameter from 1 to 3 mm.

Figures 2, 2A:
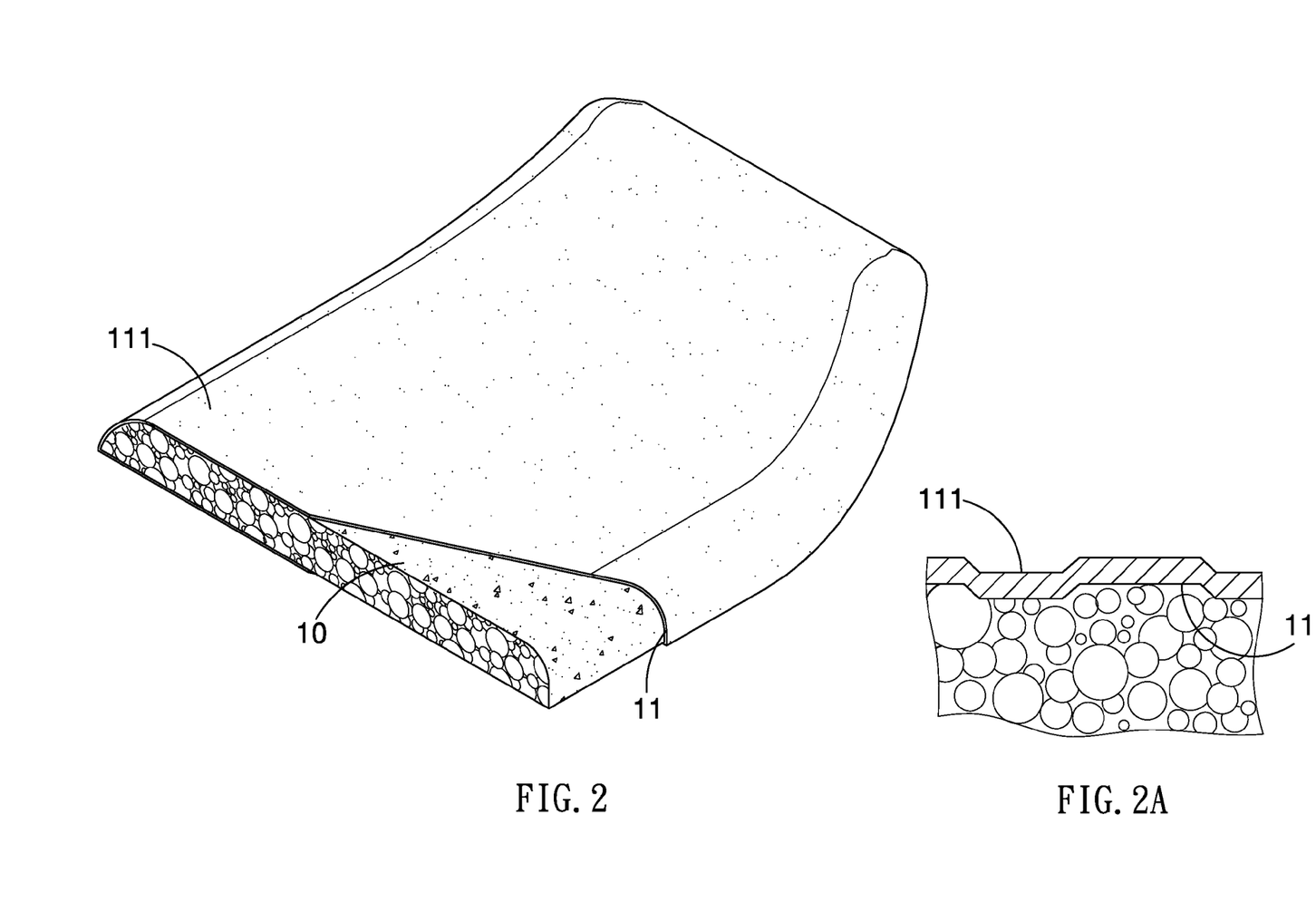
FIG. 2 is a perspective view of a slider as a first embodiment of the present invention.
FIG. 2A is a partial enlarged view of the first embodiment.

FIG. 2 illustrates a slider as a first embodiment of the present invention. The slider comprises a polyethylene foam board 10 and a plastic film 11, which encapsulates and is bonded with the polyethylene foam board 10. As shown in FIG. 2A, the plastic film 11 comprises two rugged faces 111, and a lower one of the rugged faces 111 is bonded with the polyethylene foam board 10. In the present invention, the rugged faces 111 can be made by any techniques but embossed techniques used to make the rugged faces 111 are preferred. Accordingly, the bonding between the plastic film 11 and the polyethylene foam board 10 is enhanced and strengthened by applying the embossed rugged faces 111. The plastic film 11 prevents the ultraviolet rays of the sunshine from directly projecting on the polyethylene foam board 10 and moisture from directly contacting the polyethylene foam board 10. An upper one of the rugged faces 111 of the plastic film 11 provide a proper traction to a user so that the user can hold the slider firmly.

Figure 3:
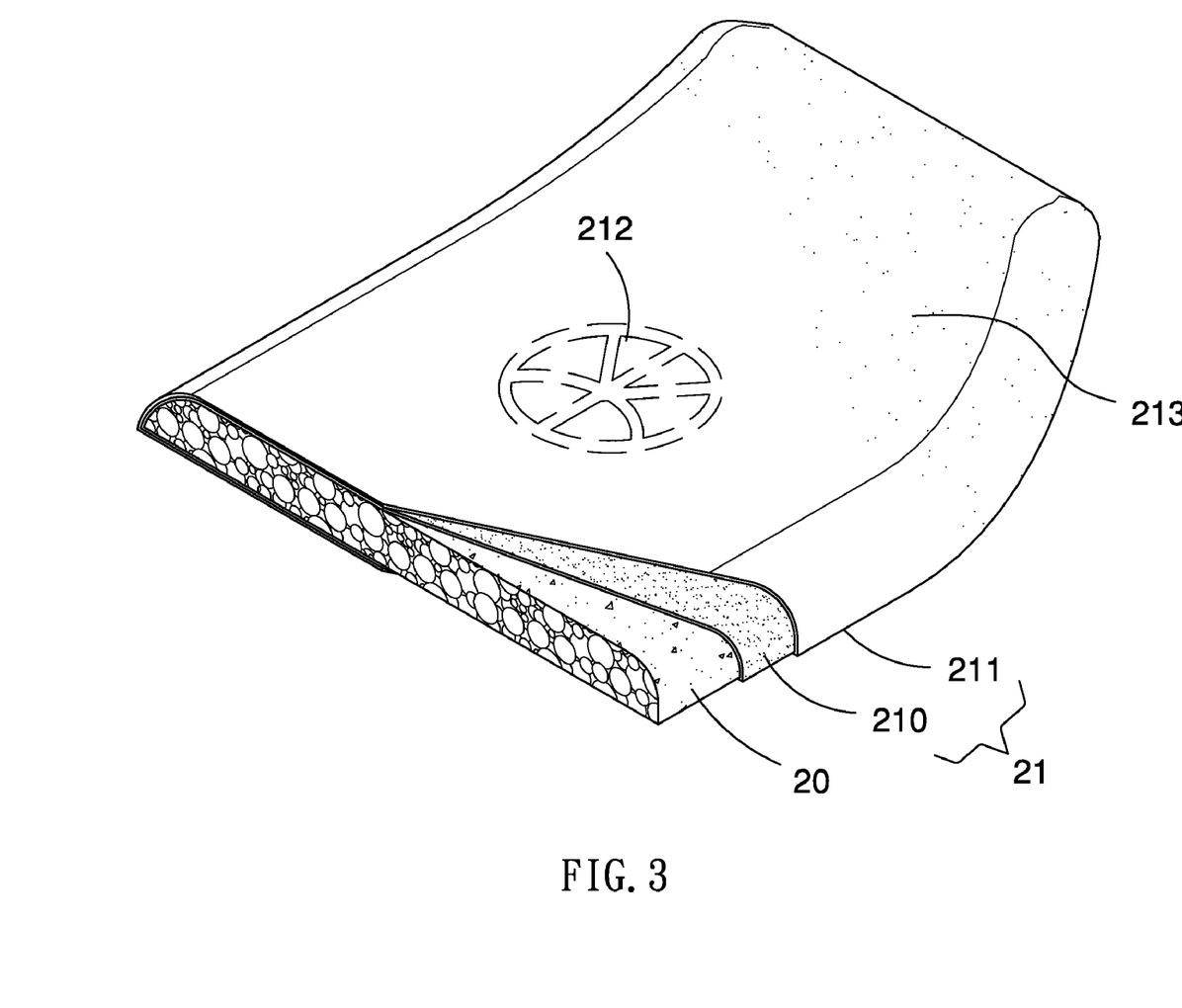
FIG. 3 is a perspective view of a slider as a second embodiment of the present invention.

FIG. 3 shows a slider as a second embodiment of the present invention. Similarly to the first embodiment, the slider of the second embodiment comprises a polyethylene foam board 20 and a plastic film 21, which seals the polyethylene foam board 20. Additionally, as shown in FIG. 3, the plastic film 21 comprises two layers 210, 211 and a pattern 212 defined between the two layers 210, 211. The pattern 212 is visible through of the plastic film 21. In the present invention, the pattern 212 can be imprinted on one of upper and lower surfaces of one of the layers 210, 211. More specifically, if the pattern 212 is imprinted on the upper surface of the layer 210, the layer 211 is provided for bonding with the upper surface of the layer 210 so as to cover the pattern 212, and vice versa. Additionally, both or either one of the layers 210, 211 can be transparent so that the pattern 212 can be seen through of the plastic film 21. Preferably, the plastic film 21 is made with a thickness of 0.02 mm to 0.15 mm, and one of the layers 210, 211 comprises a thickness greater than that of the other layer of the layers 210, 211. In this embodiment, the layer 211 preferably comprises the thickness greater than that of the layer 210, for example. Preferably, each of the thickness of the layers 210, 211 is from 0.01 mm to 0.075 mm, and both of the layers 210, 211 are made by extrusion or lamination processes.

Through two layers 210, 211, the pattern 212 is protected from wear and tear, and the polyethylene foam board 20 is also double protected by the layers 210, 211. Similarly to the first embodiment, the plastic film 21 also can comprise rugged faces 213.

Figure 4:
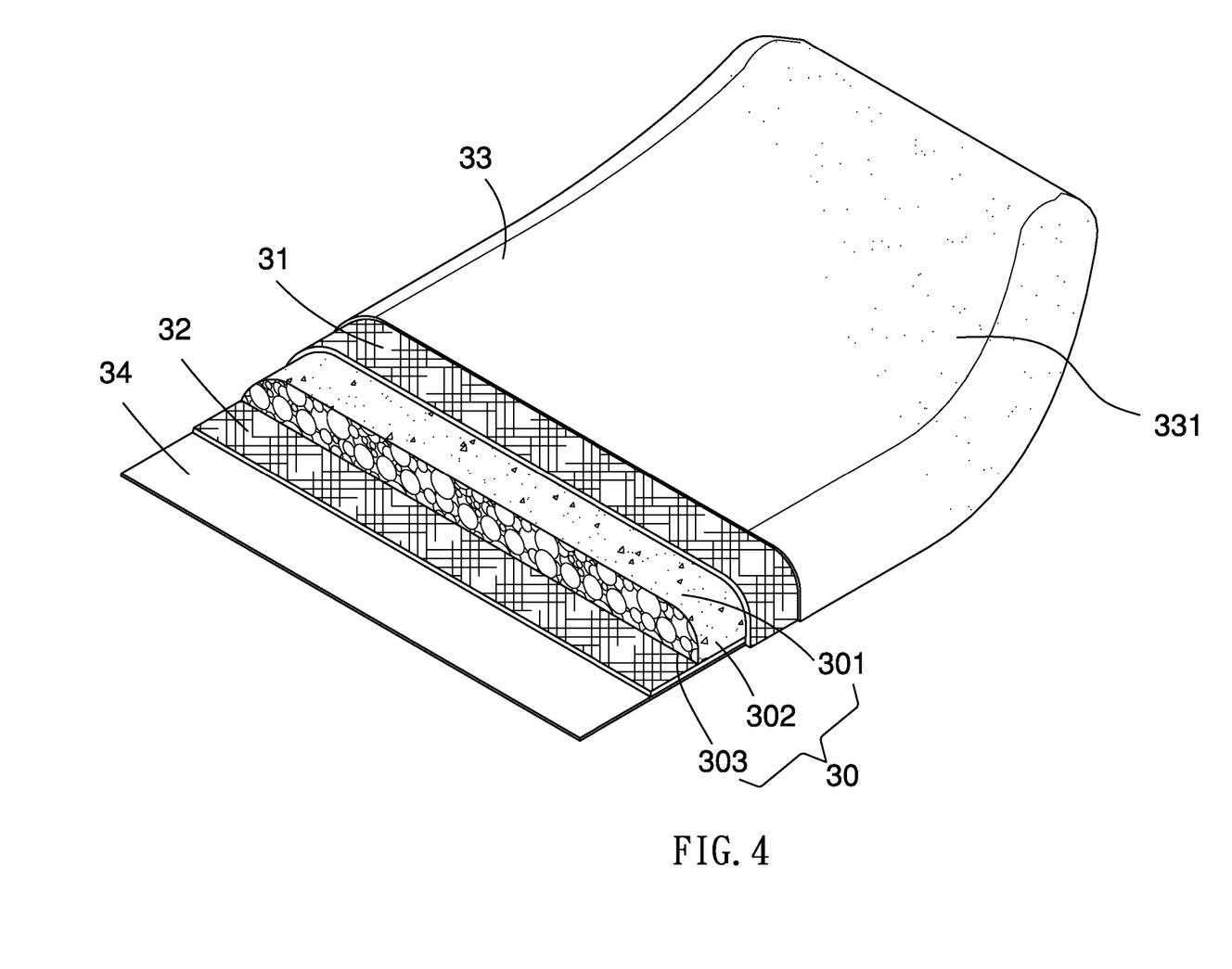
FIG. 4 is a perspective view of a slider as a third embodiment, showing the slider comprising two polyethylene foam skins.

FIG. 4 shows a slider as a third embodiment of the present invention, and the slider comprises a polyethylene foam board 30, a first polyethylene foam skin 31, a first plastic film 33, a second polyethylene foam skin 32 and a second plastic film 34. The polyethylene foam board 30 comprises a top surface 301, a bottom surface 303 and lateral surfaces 302. The first polyethylene foam skin 31 is bonded with the top surface 301 and the lateral surfaces 302 of the polyethylene foam board 30, and comprises a density greater than that of the polyethylene foam board 30. The first plastic film 33 is bonded with of the first polyethylene foam skin 31. Additionally, the second polyethylene foam skin 32 is bonded with the bottom surface 303 of the polyethylene foam board 30, and comprises a density greater than that of the polyethylene foam board 30. Furthermore, peripheries of the first and second polyethylene foam skins 31, 32 are connected. The second plastic film 34 is bonded with the second polyethylene foam skin 32. Similarly to the above embodiments, the first plastic film 33 can comprise the rugged faces 331 so as to enhance the bonding between the first plastic film 33 and the first polyethylene foam skin 31, as well as to provide a proper traction to a user to hold. Furthermore, in the third embodiment, the thickness of the second plastic film 34 is greater than the thickness of the first plastic film 33. The thickness of the first plastic film is preferably from 0.02 mm to 0.15 mm and the thickness of the second plastic film is preferably from 0.3 mm to 1.5 mm. When the slider is used as a snowboard or the like, the bottom of the slider needs stronger resistance against friction; therefore, the thickness of the second plastic film is not limited to 1.5 mm only.

Figure 5:
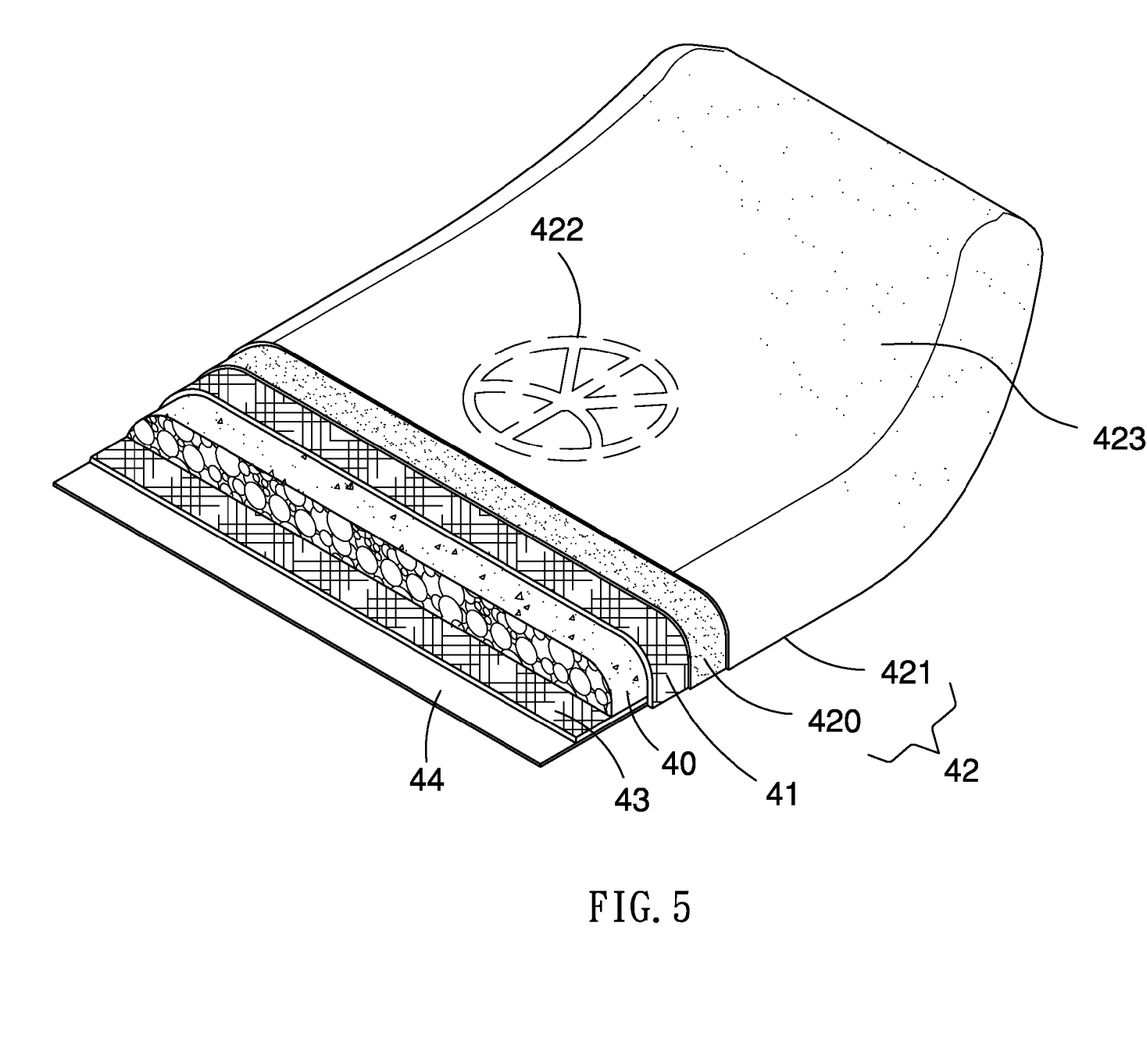
FIG. 5 is a perspective view of a slider as a fourth embodiment.

FIG. 5 further shows a slider as a fourth embodiment of the present invention, and the slider mainly incorporates the elements and structures shown in the above embodiments. In the fourth embodiment, the slider comprises a polyethylene foam board 40, a first polyethylene foam skin 41, a first plastic film 42, a second polyethylene foam skin 43 and a second plastic film 44. Additionally, the first plastic film 42 comprises two layers 420, 421 and a pattern 422 defined between the two layers 420, 421 so that the pattern 422 is visible through the first plastic film 42. Similar to the layers 210, 211 of the plastic film 21 described in the second embodiment, the pattern 422 can be imprinted on one of upper and lower surfaces of one of the layers 420, 421, and can be protected by the layers 420, 421. Furthermore, the first plastic film 42 comprises two rugged faces 423, similar to the rugged faces 111, 213 described in the first and second embodiments. Accordingly, the first polyethylene foam skin 41 comprises a rugged surface conformably bonded with one of the rugged faces 423 of the first plastic film 42. Through the rugged faces 423, the first plastic film 42 is boned with the first polyethylene foam skin 43 tightly, and the first plastic film 42 also provides a proper traction to the user to hold the slider.

The foam value of the polyethylene foam skins described in the above embodiments is arranged from 2.5 PCF to 8 PCF; therefore, the diameters of the cells in the polyethylene foam skins are less or equal to 0.5 mm. Accordingly, the polyethylene foam skins comprise smoother surfaces than that of the polyethylene foam boards. Because the plastic films are comparably thin, the user's body can feel the smoothness of the polyethylene foam skins. In addition, the polyethylene foam skins and the polyethylene foam boards are made of similar materials, so they can be easily bonded together.

Figure 6:
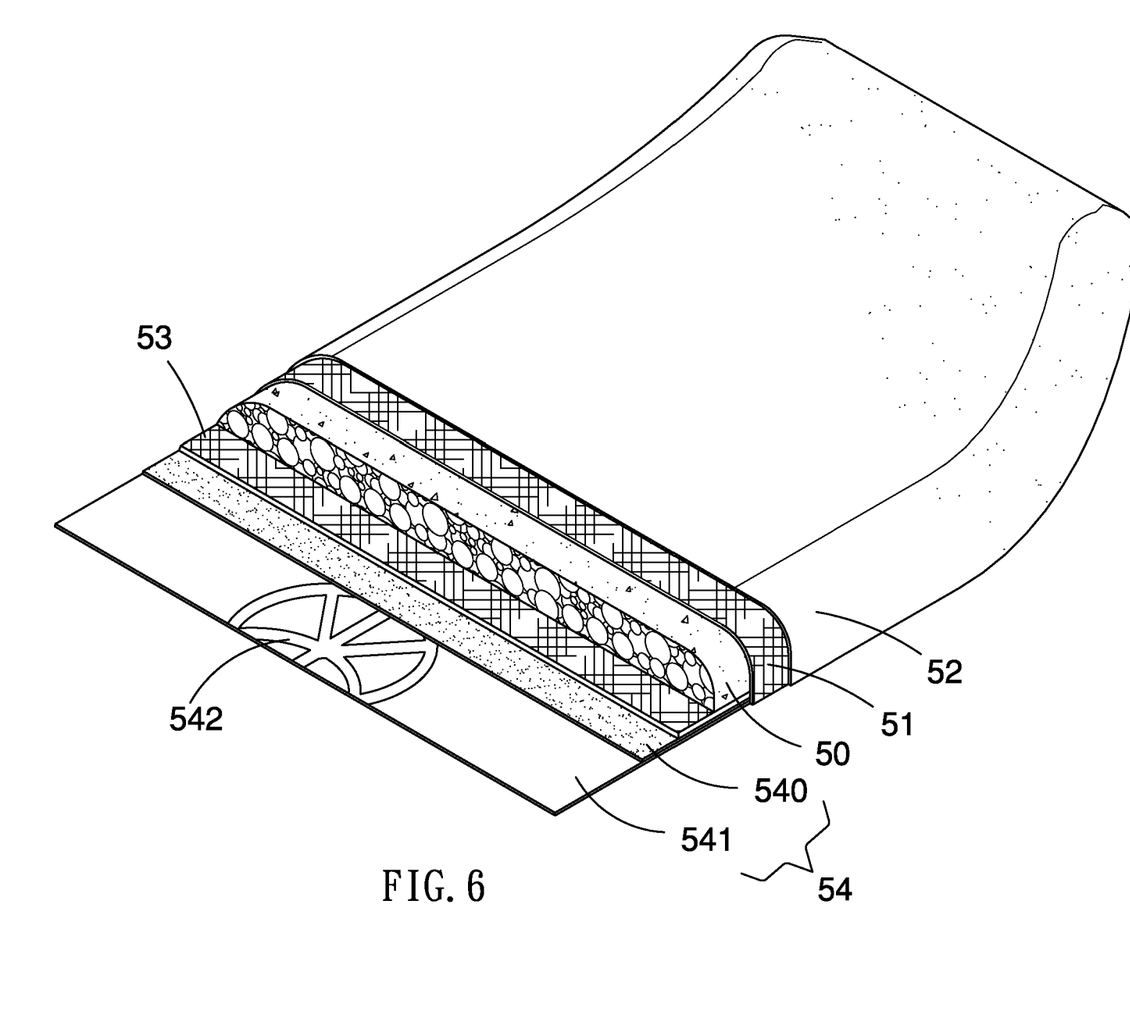
FIG. 6 is a perspective view of a slider as a fifth embodiment.

FIG. 6 shows a slider as a fifth embodiment of the present invention, and the slider also incorporates the elements and structures shown in the above embodiments. The slider in the fifth embodiment comprises a polyethylene foam board 50, a first polyethylene foam skin 51, a first plastic film 52, a second polyethylene foam skin 53 and a second plastic film 54. The second plastic film 54 comprises two layers 540, 541 and a pattern 542 defined between the layers 540, 541. Similar to the layers 210, 211 of the plastic film 21 and the layers 420, 421 of the first plastic film 42 described in the second and fourth embodiments, the pattern 542 of the second plastic film 54 can be imprinted on one of upper and lower surfaces of one of the layers 540, 541, and can be protected by the layers 540, 541. Additionally, the pattern 542 also can be seen through the second plastic film 54.

Figure 7:
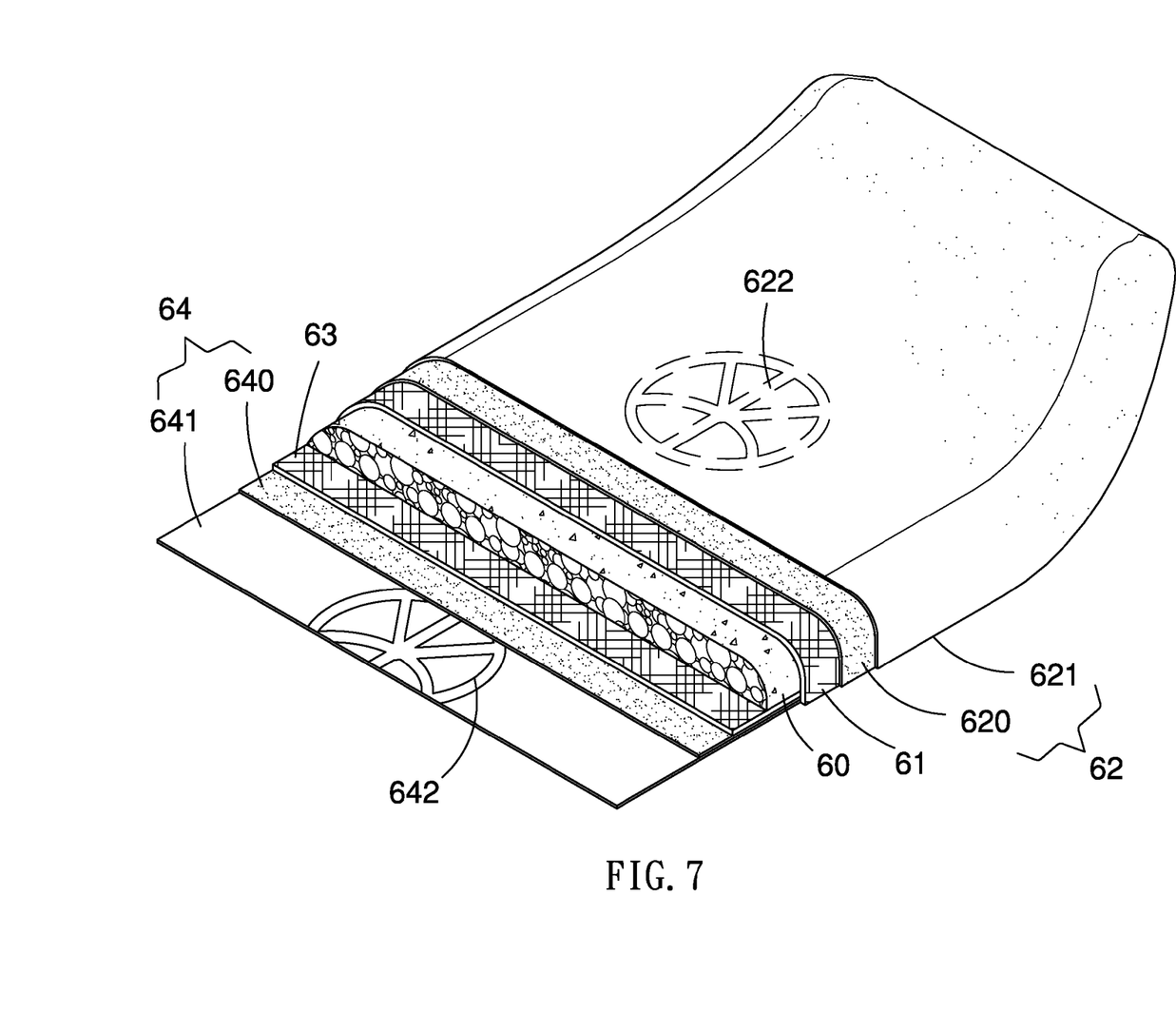
FIG. 7 is a perspective view of a slider as a sixth embodiment.

FIG. 7 further shows a slider as a sixth embodiment of the invention. The slider of the sixth embodiment mainly combines the characters of the fourth and fifth embodiments. The slider comprises a polyethylene foam board 60, a first polyethylene foam skin 61, a first plastic film 62, a second polyethylene foam skin 63 and a second plastic film 64. The first plastic film comprises two layers 620, 621 and a pattern 622. The second plastic film 64 comprises two layers 640, 641 and a pattern 642. Accordingly, the slider of the sixth embodiment provides two patterns 622, 642, and both of the patterns 622, 642 can be properly protected.

Figure 8:
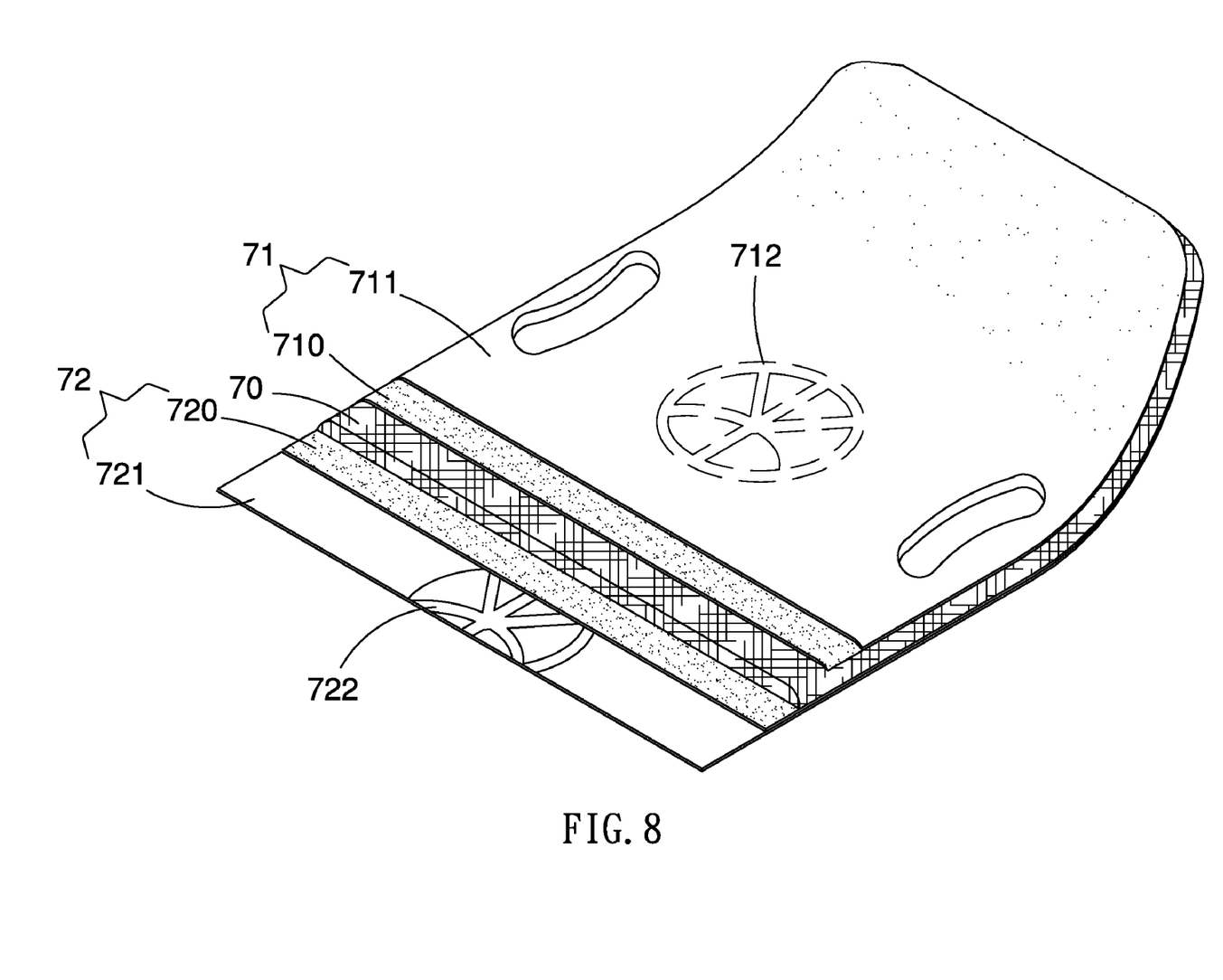
FIG. 8 is a perspective view of a slider as a seventh embodiment.

With reference to FIG. 8, a slider as a seventh embodiment mainly comprises a polyethylene foam skin 70, a first plastic film 71 and a second plastic film 72. The first plastic film 71 is similar to the above described first plastic film comprising two layers 710, 711 and a pattern 712. The second plastic film 72 also is similar to the above described second plastic film comprising two layers 720, 721 and a pattern 722. The polyethylene foam skin 70 comprises a foam value from 1.9 PCF to 6 PCF. The slider in the seventh embodiment provides a light and portable structure compared with the above embodiments.

Figure 9:
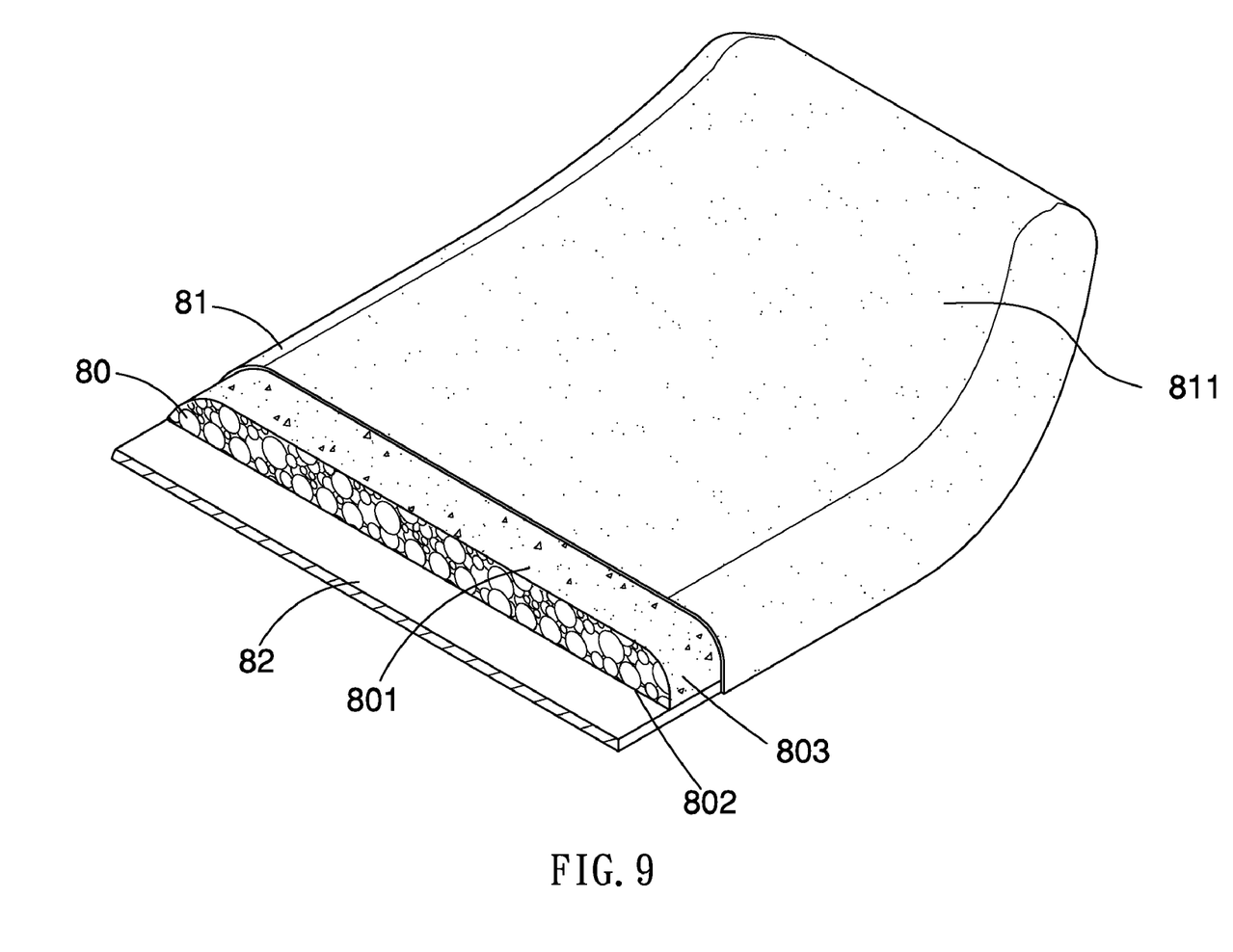
FIG. 9 is a perspective view of a slider as an eighth embodiment.

With reference to FIG. 9, a slider as an eighth embodiment comprises a polyethylene foam board 80, a base plate 82 and a plastic film 81. The polyethylene foam board 80 is formed of a foamed material. The polyethylene foam board 80 comprises an upper surface 801, a bottom surface 802 and lateral surfaces 803. The base plate 82 is bonded to the bottom surface 802 of the polyethylene foam board 80, and comprises hardness greater than that of the polyethylene foam board 80. The plastic film 81 directly and entirely encompasses the upper and lateral surfaces 801, 803 of the polyethylene foam board 80. The plastic film 81 comprises two rugged faces 811, and one of the rugged faces 811 is bonded with the polyethylene foam board 80, thereby increasing bonding surfaces between the plastic film 81 and the polyethylene foam board 80. The bottom of the base plate 82 can also be overlaid by another plastic film.

According to the above embodiments of the present invention, the slider with durable and/or patterned outer surfaces is provided.

I claim:

1. A slider comprising:
   a polyethylene foaming board having a top surface, a bottom surface and edge surfaces;
   a first polyethylene foaming skin comprising: an inner surface bonded with said top surface and said edge surfaces of said polyethylene foaming board; and an outer surface, said first polyethylene foaming skin has a density greater than a foaming rate of said polyethylene foaming board;
   a first plastic film bonded with said outer surface of said first polyethylene foaming skin, said first plastic film comprising two layers and a pattern defined between said two layers so that said pattern is visible through said first plastic film;
   a second polyethylene foaming skin comprising: an inner surface bonded with said bottom surface of said polyethylene foaming board; and
   an outer surface, said second polyethylene foaming skin having a density greater than said foaming rate of said polyethylene foaming board; and
   a second plastic film bonded with said outer surface of said second polyethylene foaming skin, wherein peripheries of said first and second polyethylene foaming skins are connected.

2. The slider of claim 1 wherein said first plastic film has a thickness ranges from 0.02 mm to 0.15 mm and said second plastic film has a thickness ranges from 0.3 mm to 1.5 mm.

3. The slider of claim 1 wherein one layer of said two layers of said first plastic film is defined as an outer film comprising an inner surface having said pattern thereon, said outer film is pervious to light; the other layer of said two layers is defined as an inner film comprising an outer surface and an inner surface, said outer surface of said inner film is bonded with said inner surface of said outer film, said inner surface of said inner film is bonded with said first polyethylene foaming skin.

4. The slider of claim 3 wherein said outer film has a thickness greater than a thickness of said inner film, wherein said thickness of said outer film ranges from 0.02 mm to 0.15 mm, said thickness of said inner film ranges from 0.01 mm to 0.15 mm.

5. The slider of claim 1 wherein said second plastic film has a thickness greater than a thickness of said first plastic film.

6. A slider comprising:
   a polyethylene foam board comprising a top surface, a bottom surface and lateral surfaces;
   a first polyethylene foam skin bonded with the top and lateral surfaces of the polyethylene foam board, the first polyethylene foam skin comprising a density greater than that of the polyethylene foam board;
   a first plastic film bonded with the first polyethylene foam skin and made with a thickness of 0.02 mm to 0.15 mm, the first plastic film comprising two layers and a pattern defined between the two layers so that the pattern is visible through the first plastic film;
   a second polyethylene foam skin bonded with the bottom surface of the polyethylene foam board, the second polyethylene foam skin comprising a density greater than that of the polyethylene foam board;
   a second plastic film bonded with the second polyethylene foam skin, wherein the second plastic film comprises a thickness greater than that of the first plastic film and the thickness ranging from 0.3 mm to 1.5 mm; and
   the first plastic film comprises two rugged faces, and the first polyethylene foam skin comprises a rugged surface conformably bonded with one of the rugged faces of the first plastic film.

7. The slider of claim 6 wherein one of the two layers comprises a thickness greater than that of the other layer of the two layers.

8. The slider of claim 6 wherein the pattern is imprinted on one of upper and lower surfaces of one of the two layers.

* * * * *

(12) EX PARTE REEXAMINATION CERTIFICATE (8484th)
United States Patent
Yeh (10) Number: US 7,326,094 C1
(45) Certificate Issued: Aug. 23, 2011

(54) SLIDER

(76) Inventor: Tzong In Yeh, Fremont, CA (US)

Reexamination Request:
No. 90/009,130, Apr. 30, 2008

Reexamination Certificate for:
Patent No.: 7,326,094
Issued: Feb. 5, 2008
Appl. No.: 11/533,254
Filed: Sep. 19, 2006

Related U.S. Application Data (63) Continuation-in-part of application No. 10/386,634, filed on Mar. 13, 2003, now Pat. No. 6,955,576.

(51) Int. Cl.
*B63B 1/00* (2006.01)
*B63B 35/73* (2006.01)
*A63C 5/14* (2006.01)

(52) U.S. Cl. .................................. 441/65; 441/74
(58) Field of Classification Search ................ None
See application file for complete search history.

(56) References Cited

U.S. PATENT DOCUMENTS 4,270,768 A * 6/1981 Nakanishi ............... 280/610
4,677,007 A * 6/1987 Murray ................... 428/35.2
4,850,913 A * 7/1989 Szabad, Jr. ................. 441/65
5,211,593 A * 5/1993 Schneider et al. ........... 441/65
5,503,921 A * 4/1996 Chang et al. ............. 428/308.4
2006/0222842 A1 * 10/2006 Thezier et al. ........... 428/319.3

FOREIGN PATENT DOCUMENTS

JP 2000-117868 * 4/2000
KR 96-4105 * 3/1996

* cited by examiner

*Primary Examiner* — Robert M. Fetsuga (57) ABSTRACT

A slider comprises a polyethylene foam board, a first polyethylene foam skin, a first plastic film, a second polyethylene foam skin and a second plastic film. The polyethylene foam board comprises a top surface, a bottom surface and lateral surfaces. The first polyethylene foam skin is bonded with the top and lateral surfaces of the polyethylene foam board; and the first polyethylene foam skin comprises a density greater than that of the polyethylene foam board. Additionally, the first plastic film is bonded with the first polyethylene foam skin, and comprises two layers and a pattern defined between the two layers. The second polyethylene foam skin is bonded with the bottom surface of the polyethylene foam board, and the second polyethylene foam skin comprises a density greater than that of the polyethylene foam board. Furthermore, the second plastic film is bonded with the second polyethylene foam skin, and comprises a thickness greater than the first plastic film.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *